(12) United States Patent
Sacripante et al.

(10) Patent No.: US 7,652,128 B2
(45) Date of Patent: Jan. 26, 2010

(54) TONER COMPOSITION

(75) Inventors: Guerino Sacripante, Oakville (CA); Ke Zhou, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 785 days.

(21) Appl. No.: 10/981,528

(22) Filed: Nov. 5, 2004

(65) Prior Publication Data

US 2006/0100300 A1    May 11, 2006

(51) Int. Cl.
G03G 9/087    (2006.01)
(52) U.S. Cl. ................... 528/274; 522/60; 522/6; 252/390; 430/123.5; 430/137.15; 430/124.1; 430/109.4
(58) Field of Classification Search .......... 430/123.5, 430/137.15, 124.1, 109.4; 264/4.3; 523/161, 523/334, 335; 399/330; 528/274; 522/60, 522/6; 252/390
See application file for complete search history.

(56) References Cited

U.S. PATENT DOCUMENTS

| | | | |
|---|---|---|---|
| 3,590,000 A | 6/1971 | Palermiti et al. ......... 430/108.3 |
| 3,800,588 A | 4/1974 | Larson et al. ............... 73/664 |
| 3,922,212 A * | 11/1975 | Gilchrist ................... 204/480 |
| 3,944,493 A | 3/1976 | Jadwin et al. .......... 430/108.21 |
| 4,007,293 A | 2/1977 | Mincer et al. ............ 430/111.1 |
| 4,079,014 A | 3/1978 | Burness et al. ......... 430/108.21 |
| 4,298,672 A | 11/1981 | Lu ............................. 430/108.2 |
| 4,394,430 A | 7/1983 | Jadwin et al. ............ 430/108.2 |
| 4,464,452 A | 8/1984 | Gruber et al. ............ 430/108.2 |
| 4,480,021 A | 10/1984 | Lu et al. ................... 430/108.5 |
| 4,560,635 A | 12/1985 | Hoffend et al. .......... 430/108.2 |
| 4,656,112 A | 4/1987 | Kawagishi et al. ....... 430/108.8 |
| 4,788,123 A | 11/1988 | Berkes et al. ............ 430/124.4 |
| 4,828,956 A | 5/1989 | Creatura et al. .......... 430/137.1 |
| 4,845,003 A | 7/1989 | Kiriu et al. ............ 430/108.24 |
| 4,894,308 A | 1/1990 | Mahabadi et al. ....... 430/137.18 |
| 4,937,157 A | 6/1990 | Haack et al. ............. 430/108.2 |
| 4,948,686 A | 8/1990 | Koch et al. ............... 430/45.31 |
| 4,963,455 A | 10/1990 | Laing et al. .............. 430/109.3 |
| 4,965,158 A | 10/1990 | Gruber et al. ............ 430/108.2 |
| 5,225,278 A * | 7/1993 | Kielbania et al. ....... 428/402.22 |
| 5,227,460 A | 7/1993 | Mahabadi et al. .......... 528/272 |
| 5,278,017 A * | 1/1994 | Tsujihiro ................. 430/108.5 |
| 5,278,020 A | 1/1994 | Grushkin et al. ......... 430/109.3 |
| 5,290,654 A | 3/1994 | Sacripante et al. ..... 430/137.14 |
| 5,308,734 A | 5/1994 | Sacripante et al. ..... 430/137.14 |
| 5,344,738 A | 9/1994 | Kmiecik-Lawrynowicz et al. . 430/137.14 |
| 5,346,797 A | 9/1994 | Kmiecik-Lawrynowicz et al. . 430/137.14 |
| 5,348,832 A | 9/1994 | Sacripante et al. ....... 430/109.4 |
| 5,364,729 A | 11/1994 | Kmiecik-Lawrynowicz et al. . 430/137.14 |
| 5,366,841 A | 11/1994 | Patel et al. ............ 430/137.14 |
| 5,370,963 A | 12/1994 | Patel et al. ............. 430/137.14 |
| 5,376,172 A | 12/1994 | Tripp et al. .................. 106/490 |
| 5,403,693 A | 4/1995 | Patel et al. ............. 430/137.14 |
| 5,405,728 A | 4/1995 | Hopper et al. .......... 430/137.14 |
| 5,418,108 A | 5/1995 | Kmiecik-Lawrynowicz et al. . 430/137.14 |
| 5,482,812 A | 1/1996 | Hopper et al. .......... 430/137.14 |
| 5,496,676 A | 3/1996 | Croucher et al. ........ 430/137.14 |
| 5,501,935 A | 3/1996 | Patel et al. ............. 430/137.14 |
| 5,527,658 A | 6/1996 | Hopper et al. .......... 430/137.14 |
| 5,585,215 A | 12/1996 | Ong et al. ................. 430/108.2 |
| 5,593,807 A | 1/1997 | Sacripante et al. ..... 430/137.14 |
| 5,604,076 A | 2/1997 | Patel et al. ............. 430/137.14 |
| 5,622,806 A | 4/1997 | Veregin et al. .......... 430/137.14 |
| 5,648,193 A | 7/1997 | Patel et al. ............. 430/137.14 |
| 5,650,255 A | 7/1997 | Ng et al. ................ 430/137.14 |
| 5,650,256 A | 7/1997 | Veregin et al. .......... 430/137.14 |
| 5,658,704 A | 8/1997 | Patel et al. ............. 430/137.14 |
| 5,660,965 A | 8/1997 | Mychajlowskij et al. ..... 430/137.14 |
| 5,723,253 A | 3/1998 | Higashimo et al. ........... 430/166 |
| 5,744,520 A | 4/1998 | Kmiecik-Lawrynowicz et al. ..... 523/334 |
| 5,747,215 A | 5/1998 | Ong et al. .............. 430/137.14 |
| 5,763,133 A | 6/1998 | Ong et al. .............. 430/137.14 |
| 5,766,818 A | 6/1998 | Smith et al. ............ 430/137.17 |
| 5,804,349 A | 9/1998 | Ong et al. .............. 430/109.31 |
| 5,827,633 A | 10/1998 | Ong et al. .............. 430/137.14 |
| 5,840,462 A | 11/1998 | Foucher et al. ......... 430/137.14 |
| 5,853,944 A | 12/1998 | Foucher et al. ......... 430/137.14 |
| 5,863,698 A | 1/1999 | Patel et al. ............. 430/137.14 |
| 5,869,215 A | 2/1999 | Ong et al. .............. 430/137.14 |
| 5,902,710 A | 5/1999 | Ong et al. ............... 430/108.1 |
| 5,910,387 A | 6/1999 | Mychajilowskij et al. ..... 430/109.31 |
| 5,916,715 A | 6/1999 | Fulford, Jr. et al. ........... 430/22 |
| 5,916,725 A | 6/1999 | Patel et al. ............. 430/137.14 |
| 5,919,595 A | 7/1999 | Mychajilowskij et al. ..... 430/137.14 |
| 5,922,501 A | 7/1999 | Cheng et al. ........... 430/137.14 |
| 5,925,488 A | 7/1999 | Patel et al. ............. 430/137.14 |
| 5,945,245 A | 8/1999 | Mychajlowskij et al. ..... 430/137.14 |
| 5,977,210 A | 11/1999 | Patel et al. ................. 523/161 |

(Continued)

FOREIGN PATENT DOCUMENTS

EP    0 558 788 A1    9/1993

OTHER PUBLICATIONS

Brauer, G.M., et al., "Initiator-Accelerator Systems for Dental Resins," *F.E. Jr. Ed. ACS*, pp. 359-371 (1983).

*Primary Examiner*—Mark F Huff
*Assistant Examiner*—Rachel L Burney
(74) *Attorney, Agent, or Firm*—MH2 Technology Law Group LLP

(57) ABSTRACT

A composition including an initiator and an unsaturated sulfopolyester amine resin, and processes for preparing and using thereof.

20 Claims, No Drawings

U.S. PATENT DOCUMENTS

| | | | |
|---|---|---|---|
| 6,004,714 A | 12/1999 | Ciccarelli et al. | 430/108.3 |
| 6,017,671 A | 1/2000 | Sacripante et al. | 430/108.8 |
| 6,020,101 A | 2/2000 | Sacripante et al. | 430/110.2 |
| 6,045,240 A | 4/2000 | Hochstein | 362/294 |
| 6,114,076 A * | 9/2000 | Odell et al. | 525/444 |
| 6,132,924 A | 10/2000 | Patel et al. | 430/137.14 |
| 6,143,457 A | 11/2000 | Carlini et al. | 430/108.2 |
| 6,190,815 B1 | 2/2001 | Ciccarelli et al. | 430/110.4 |
| 6,203,961 B1 | 3/2001 | Pan et al. | 430/114 |
| 6,210,853 B1 | 4/2001 | Patel et al. | 430/137.14 |
| 6,214,507 B1 | 4/2001 | Sokol et al. | 430/108.2 |
| 6,348,561 B1 | 2/2002 | Mychajlowskij et al. | 528/288 |
| 6,432,601 B1 | 8/2002 | Foucher et al. | |
| 6,673,500 B1 | 1/2004 | Patel et al. | 430/108.2 |
| 2002/0187415 A1 | 12/2002 | Jiang et al. | |
| 2003/0054280 A1* | 3/2003 | Ishihara et al. | 430/124 |
| 2003/0119943 A1* | 6/2003 | Tucker et al. | 523/160 |
| 2003/0165760 A1* | 9/2003 | Higuchi et al. | 430/108.4 |

\* cited by examiner

TONER COMPOSITION

FIELD

The present disclosure relates to compositions comprising an initiator and an unsaturated sulfopolyester amine resin and processes for preparing and using thereof.

INTRODUCTION

A current trend in the printing industry is xerographic packaging applications. Such applications generally use heat fused toners. However, there are a number of problems associated with using heat fused toners in these applications. One problem relates to fusing toners on rough or thick substrates, such as cardboard stock, or on aluminum substrate. Moreover, it is difficult to transfer the heat of a heat-roll fuser system through heavy and textured papers, much less the very high area coverage of color print jobs.

Additionally, printing for a number of packaging applications can require the use of materials that are durable and which are resistant to a variety of conditions and environmental factors. Conventional package printing uses curable inks, such as ultraviolet or thermal curable inks, to "toughen" the resulting printed image or indicia such that the image or indicia on the final packaging is durable and wear-resistant. In addition, many offset printings use a heated overcoat to protect the image from abrasion. However, overcoats applied to fused and unfused images can cause degradation of image quality. Accordingly, there is a need for a toner composition that in embodiments may not require a protective overcoat.

Electrophotographic toners are generally comprised of a resin, such as a styrene-acrylate or polyester, a colorant and optionally a charge control agent. Many toner formulations are known, and more specifically, one toner formulation comprises an unsaturated polyester resin, such that desirable low fixing temperatures and offset properties are attained, reference, for example, U.S. Pat. No. 5,227,460.

U.S. Pat. No. 5,916,715 discloses a process for preparing a toner comprising mixing an amine, an emulsion latex containing sulfonated polyester resins, and a colorant dispersion.

U.S. Pat. No. 5,945,245 discloses a surfactant-free process for preparation of a toner comprising heating a mixture of an emulsion latex, a colorant, and an organic complexing agent.

U.S. Pat. No. 6,203,961 discloses a reverse charging printing liquid developer comprising a nonpolar liquid, and dispersed therein a toner comprising a sulfonated polyester resin and a colorant.

U.S. Pat. No. 6,673,500 discloses a toner comprising a waterborne polymer resin, a colorant, and a UV fluorescent component.

U.S. Pat. No. 6,348,561 discloses an alkali sulfonated polyester-amine resin generated from the reaction of an organic diol, and a mixture of an organic diacid, an alkali sulfonated diacid and an amino-organic diacid.

Some toners comprising an unsaturated polyester based toner resin, after fusing, can be cross-linked with UV light at elevated temperatures and with the presence of a UV initiator. The UV initiator can be applied on the toner image as a lacquer in post application or applied to the toner developer in the form of an external additive or within the toner dispersion during the manufacturing process. However, the UV curable toners require the use of a post fusing UV apparatus system, which is presently not available in a commercial xerographic engine.

There is a need for robust toners with broad fusing latitude, high gloss, and non-document offset properties. A need remains for a fused image that can be cured so that the resulting image is free of abrasion and smearing. A need remains for a toner that can be crosslinked during the fusing process without the need for UV light.

SUMMARY

In aspects there are disclosed a composition comprising an initiator and an unsaturated sulfopolyester amine resin; a toner composition comprising, a colorant, an initiator, and an unsaturated sulfopolyester amine resin; and a process for preparing a toner composition comprising (a) preparing a latex emulsion comprising particles from an unsaturated sulfopolyester amine resin, (b) combining the latex emulsion with a colorant dispersion and an initiator dispersion, (c) adding thereto a flocculating agent and heating the mixture to a temperature below the glass transition temperature of the resin, and (d) after heating the latex emulsion containing the resin to a temperature below the glass transition temperature of the resin, heating the latex emulsion containing the resin to a temperature above the glass transition temperature of the resin.

In other aspects there are disclosed an image process comprising forming an image, developing an image with a toner composition comprising a colorant, an initiator, and an unsaturated sulfopolyester amine resin, and fusing the toner formed image; a toner curing process comprising fusing a toner composition comprising a colorant, an initiator, and an unsaturated sulfopolyester amine resin; wherein the initiator crosslinks an unsaturated residue of the resin; and a method for crosslinking a toner composition comprising fusing the toner composition formed by an emulsion aggregation process, wherein the toner composition comprises a colorant, an initiator, and an unsaturated sulfopolyester amine resin.

DESCRIPTION OF VARIOUS EMBODIMENTS

The disclosed composition may comprise an initiator and an unsaturated sulfopolyester amine resin. The unsaturated sulfopolyester amine resin contains a polyester backbone having an amine residue polymerized into the polyester backbone. The disclosed toner compositions may be prepared by an emulsion aggregation process.

The initiator may be selected from the group consisting of thermal initiators, free radical initiators, and ultra violet initiators. Non-limiting examples of initiators include benzoin ethers, acetophenone derivatives such as 2,2-dimethoxy-2-phenyl acetophenone, 2-hydroxy-2-methyl-1-phenylpropan-1-one, 2,2,2-trichloroacetophenone, and the like. Suitable hydrogen abstraction type initiators include benzophenone and derivatives thereof, anthraquinone, 4,4'-bis(dimethylamino)benzophenone, thioxanthone with quinoline sulfonylchloride, 2,4,6-trimethylbenzoyl-diphenyl-phosphine oxide, (2-methyl-1-[4-(methylthio)phenyl]-2-morpholinopropane-1-one), (hydroxycyclohexyl)phenyl ketone, (2-benzyl-2-N-dimethylamino-1-(4-morpholinophenyl)-1-butanone), (benzyl dimethyl ketal), 2-(carbamoylazo)-substituted, 2-n-propoxy-9H-thioxanthen-9-one, and ethyl 4-(dimethylamino)benzoate. Suitable donor-acceptor complexes include combinations of donors, such as triethanolamine, with acceptors such as benzophenone. Other suitable sensitizers or initiators may include thioxanthone with quinoline sulfonylchloride; arsines, phosphones, thioureas, benzyl acetals, α-haloacetoophenones 2,4,6-trimethylbenzoyl diphenylphosphine oxide, (2-methyl-1-[4-(methylthio)phenyl]-2-morpholinopropane-1-one), (hydroxycyclohexyl) phenyl ketone, (2-benzyl-2-N-dimethylamino-1-(4-morpholinophenyl)-1-butanone), (benzyl dimethyl ketal), 2-(carbamoylazo)-substituted, 2-n-propoxy-9H-thioxanthen-9-one and ethyl 4-(dimethylamino)benzoate, and the like.

The initiator may also be selected from the group consisting of peroxides, azo compounds, and pinacols. Non-limiting examples of peroxides include inorganic or organic peroxides, including potassium peroxide sulfate, organic hydroperoxides, benzoyl peroxide, lauryl peroxide, 1-1-(t-butylperoxy)-3,3,5-trimethylcyclohexane, n-butyl-4,4-di-(t-butylperoxy)valerate, dicumyl peroxide, dibenzoyl peroxide, di-(n-propyl) peroxydicarbonate, t-butyl benzoate, t-amyl(2-ethylhexyl)monoperoxydicarbonate, 2,2-di-(t-butyl-peroxy) butane, dicumyl peroxide, 2,5-dimethyl-2,5-di(t-butylperoxy)-hexane, 1,3-bis(t-butylperoxyisopropyl)benzene, 1,3-bis(cumylperoxyisopropyl)benzene, 2,4-dichlorobenzoyl peroxide, caprylyl peroxide, lauroyl peroxide, t-butyl peroxyisobutyrate, p-chlorobenzoyl peroxide, hydroxyheptyl peroxide, di-t-butyl diperphthalate, 1,1-di(t-butylperoxy)-3,3,5-trimethylcyclohexane, di-t-butyl peroxide, benzoyl peroxides, lauryl peroxide, n-butyl-4,4-di-(t-butylperoxy)valerate, hydrogen peroxide, acetyl peroxide, cumyl peroxide, tert-butyl peroxide, propyonyl peroxide, chlorobenzoyl peroxide, dichlorobenzoyl peroxide, bromomethylbenzoyl peroxide, ammonium persulfate, sodium persulfate, potassium persulfate, diisopropyl peroxycarbonate, tetralin hydroperoxide, 1-phenyl-2-methylpropyl-1-hydroperoxide, tert-butyl triphenylperacetate hydroperoxide, tert-butyl performate, tert-butyl peracetate, tert-butyl perbenzoate, tert-butyl phenylperacetate, tert-butyl methoxyperaceate and tert-butyl N-(3-toluyl) percarbamate, and mixtures thereof.

Non-limiting examples of the azo and diazo compounds include 2,2'-azobispropane, 2,2'-dichloro-2,2'-azobispropane, 1,1'-azo(methylethyl) diacetate, 2,2'-azobis(2-amidinopropane)hydrochloride, 2,2'-azobis(2-amidinopropane) nitrate, 2,2'-azobisisobutane, 2,2'-azobisisobutylamide, 2,2'-azobisisobutylonitrile, methyl 2,2'-azobis-2-methylpropionate, 2,2'-dichloro-2,2'-azobisbutane, 2,2'-azobis-2-methylbutylonitrile, dimethyl 2,2'-azobisisobutylate, 1,1'-azobis (sodium 1-methylbutylonitrile-3-sulfonate), 2-(4-methylphenylazo)-2-methylmalonodinitrile, 4,4'-azobis-4-cyanovaleric acid, 3,5-dihydroxymethylphenylazo-2-methylmalonodinitrile, 2-(4-bromophenylazo)-2-allylmalononitrile, 2,2'-azobis-2-methylvaleronitrile, dimethyl 4,4'-azobis-4-cyanovalarate, 2,2'-azobis-2,4-dimethylvaleronitrile, 1,1'-azobiscyclohexanenitrile, 2,2'-azobis-2-propylbutylonitrile, 1,1'-azobis-1-chlorophenylethane, 1,1'-azobis-1-cyclohexanecarbonitrile, 1,1'-azobis-1-cycloheptanenitrile, 1,1'-azobis-1-phenylethane, 1,1'-azobiscumene, ethyl 4-nitrophenylazobenzylcyanoacetate, phenylazodiphenylmethane, phenylazotriphenylmethane, 4-nitrophenylazotriphenylmethane, 1,1'-azobis-1,2-diphenylethane, poly(bisphenol A-4,4-azobis-4-cyanopentanoate), poly(tetraethylene glycol-2,2'-azobisisobutylate), azoisobutyronitrile, azodimethylvaleronitrile, diazoamineazobenzene 2,2'-azodimethylvaleronitrile, 2,2'-azoisobutyronitrile, azobiscyclohexanenitrile, 2-methylbutyronitrile, 2-t-butylazo-2-cyanopropane; 2,2'-azobis(2,4-dimethyl-4-methoxyvaleronitrile), 2,2'-azobis(isobutyronitrile), 2,2'-azobis(2,4-dimethylvaleronitrile), 1,1'-azobis(cyclohexanecarbonitrile), and mixtures thereof.

Non-limiting examples of pinacols include substituted or unsubstituted pinacols, benzopinacol, 4,4'-dichlorobenzopinacol, 4,4'-dibromobenzopinacol, 4,4'-diiodobenzopinacol, 4,4',4'',4'''-tetrachlorobenzopinacol, 2,2',4,4'-tetrachlorobenzopinacol, 4,4'-dimethylbenzopinacol, 3,3'-dimethylbenzopinacol, 2,2'-dimethylbenzopinacol, 3,3',4,4'-tetramethylbenzopinacol, 4,4'-dimethoxybenzopinacol, 4,4',4'',4'''-tetramethoxybenzopinacol, 4,4'-diphenylbenzopinacol, 4,4'-dichloro-4'',4'''-dimethylbenzopinacol, 4,4'-dimethyl-4'',4'''-diphenylbenzopinacol, xanthonpinacol fluorenonepinacol, acetophenonepinacol, 4,4'-dimethylacetophenone-pinacol, 4,4'-dichloroacetophenonepinacol, 1,1,2-triphenylpropane-1,2-diol, 1,2,3,4-tetraphenyl butane-2,3-diol, 1,2-diphenylcyclobutane-1,2-diol, propiophenone-pinacol, 4,4'-dimethylpropiophenonepinacol, 2,2'-diethyl-3,3'-dimethoxypropiophenone-pinacol, 1,1,1,4,4,4-hexafluoro-2,3-diphenyl-butane-2,3-diol, benzopinacol-mono methylether, benzopinacol-mono-phenylether, benzopinacol and monoisopropyl ether, benzopinacol monoisobutyl ether, benzopinacol mono(diethoxy methyl) ether, and mixtures thereof.

The initiator may be present in the toner composition in an amount of from about 1 to about 10 weight percent, for example from about 2 to about 7 weight percent based upon the total weight of the toner composition. The amount may also be outside of these ranges so long as the initiator initiates the cross-linking polymerization of an unsaturated residue of the resin. The initiator may have a half-life of from about 80° C. to 120° C.

The unsaturated sulfopolyester amine resin may comprise (i) an amine residue present in an amount of from about 0.1 to about 10 weight percent, for example from about 2 to about 7 weight percent, based upon the total weight of the resin; (ii) an alkali sulfonate residue present in an amount of from about 1.5 to about 5 weight percent, for example from about 2 to about 4 weight percent based upon the total weight of the resin; and (iii) an unsaturated residue present in an amount of from about 5 to about 45 weight percent, for example from about 15 to about 30 weight percent based upon the total weight of the resin. The amine residue may function as a crosslinking accelerator or sensitizer with the initiator, such as a peroxide, and unsaturated residue of the resin to allow for crosslinking of the toner. See Brauer et al., "Initiator—Accelerator Systems for Dental Resin," *F. E. Jr. Ed. ACS*, pp. 359-371(1983), the disclosure of which is hereby incorporated by reference.

The amine residue may reduce the time and temperature at which dissociation of an initiator, such as a peroxide, to produce free radicals will occur. The amine residue may be incorporated into a conventional polyester backbone and may facilitate preparing cross-linked toner resins, for example, during the fusing of the toner onto a substrate such as paper, or by a post fusing process used to prepare the image.

In embodiments, the amine residue which may be utilized in preparing the unsaturated sulfopolyester amine resin include primary functional alkyl amines, secondary functional alkyl amines and tertiary functional alkyl amines. In an embodiment, tertiary functional alkyl amines may be used. In another embodiment, aromatic functional amines may be used. Additionally, the amine residue may possess a chemical functional group that allows the amine residue to be incorporated into a polyester backbone. For example, the chemical functional group may be a hydroxyl group, and as a further example may be two hydroxyl functional groups per molecule to allow incorporation throughout the backbone. Exemplary aromatic functional amines include, but are not limited to, N-phenyidiethanolamine, N,N-di(2-hydroxyethyl)-p-toluidine, N,N-di(2-hydroxypropyl)-p-toluidine, 2,6-dimethanol pyridine, 2,4-dihydroxy-5,6-dimethylpyrimidine, 2,4-dihydroxy dihydroxy-6-methylpyrimidine, 4,6-dihydroxypyrimidine, 2,4-dihydroxypyridine, phenylethylethanolamine. Exemplary tertiary alkyl amines include, but are not limited to, methyidiethanolamine, ethyldiethanolamine, dimethylisopropanolamine, and diisopropylethanolamine. Exemplary secondary and primary functional amines include, but are not limited to, the following alkanol amines: diethanolamine, diisopropanolamine, di-sec-butanolamine, 2-amino-2-ethyl-1,3-propanediol, methylethanolamine, phenylethanolamine, 2-aminoethanol, and 2-amino-2-methyl-1-propanol.

The alkali sulfonate residue may impart the required hydophilicity necessary for the preparation of the toner via the known aggregation coalescence process in an aqueous media as disclosed in U.S. Pat. No. 5,227,460, the disclosure of which is totally incorporated herein by reference. More specifically, the alkali sulfonate residue renders the resin dissipatable in water such that submicron polyester particles in the range of from about 5 nm to about 250 nm may be generated when heated above the Tg of the resin in water.

The unsaturated residue may be a linear unsaturated polyester and may be a low molecular weight condensation polymer. It is understood that low molecular weight means from about 4000 to about 20,000. This polymer may be formed by the reactions between both saturated and unsaturated diacids (or anhydrides) and dihydric alcohols (glycols or diols) in the presence of a polycondensation catalyst. The resulting unsaturated polyesters may be reactive (e.g., cross-linkable) on two fronts: (i) unsaturation sites (double bonds) along the polyester chain, and (ii) functional groups such as carboxyl, hydroxy, etc. groups amenable to acid-base reactions.

Various diacids or esters of diacids can be chosen to form the unsaturated sulfopolyester amine resin of the present disclosure, such as those selected from the group consisting of fumaric acid, malonic acid, itaconic acid, 2-methylitaconic acid, maleic acid, maleic anhydride, adipic acid, succinic acid, suberic acid, 2-ethyl succinic acid, glutaric acid, dodecylsuccinic acid, 2-methyladipic acid, pimelic acid, azelaic acid, sebacic acid, terephthalic acid, isophthalic acid, phthalic acid, 1,2-cyclohexanedioic acid, 1,3-cyclohexanedioic acid, 1,4-cyclohexanedioic acid, dialkyl esters wherein alkyl contains from about 2 to about 22 carbon atoms, and may be esters of malonate, succinate, fumarate, itaconate, terephthalate, isophthalate, phthalate, cyclohexanedioate, and mixtures thereof. The diacids may optionally be selected in an amount of from 35 mole percent to about 0.45 mole percent based on about 100 mole percent of the resin, provided that at least about 5 to about 35 mole percent of the acid residue chosen is unsaturated such as the unsaturated sulfopolyester amine resin of the present disclosure. In embodiments, the diacid may be selected from the group consisting of fumaric acid, malonic acid, itaconic acid, 2-methylitaconic acid, maleic acid, and maleic anhydride.

In embodiments, examples of sulfonated organic diacids or esters of diacids include those selected from the group consisting of sodio 5-sulfoisophthalic acid, potasio 5-sulfoisophthalic acid, sodio 2-sulfoterephthalic acid, potasio 2-sulfoterephthalic acid, dimethyl 5-sulfoisophthalate sodium salt, dimethyl 5-sulfoisophthalate potassium salt, and mixtures thereof. The diacids may be optionally present in an amount of from 1 mole percent to about 10 mole percent, based on about 100 mole percent of the resin.

Examples of organic diols which may be utilized in preparing the unsaturated sulfopolyester amine resin include, but are not limited to, diols or glycols, such as alkylene glycols, with a carbon chain length of, for example, from about 1 to about 25 carbon atoms, and as a further example, ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, hexylene glycol, heptalyne glycol, diethylene glycol, dipropylene glycol, cyclohexane diol, 2,2-dimethyl propane diol, 1,2-propanediol, neopentylene glycol, octylene glycol, cyclohexane dimethanol, and mixtures thereof. The organic diols, including the diols or glycols, may be employed in various effective amounts of, for example, from about 45 to about 55 mole percent of the resin.

Suitable poycondensation catalysts may be selected from the group consisting of tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof. The polycondensation catalysts may be present in an amount of from about 0.01 mole percent to about 5 mole percent based on the starting diacid or diester used to generate the polyester.

The unsaturated sulfopolyester amine resin may in embodiments be represented by:

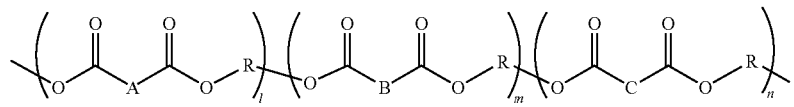

wherein A may be an arylene comprising from about 6 to about 36, for example from about 10 to about 28 carbon atoms such as a benzylene, bisphenylene, bis(alkyloxy) bisphenolene, and the like; I may be a number of segments of from about 10 to about 1,000, for example, from about 100 to about 700; B may be an organo alkali sulfonate comprising from about 2 to about 25 carbon atoms, such as a metalo 5-sulfoisophthalte, metalo sulfoethylene, metalo sulfopropylene, and the like, wherein the metalo ion may be an alkali metal such as lithium, sodium, potassium, magnesium or transition metal such as zinc and the like; m may be the number of segments of from about 10 to about 1,000, for example, from about 100 to about 700; C may be an unsaturated alkene comprising from about 2 to about 25 carbon atoms such as ethene, propene, butane and the like; R may be an alkylene comprising from about 2 to about 25 carbon atoms, such as ethylene, propylene, butylene, oxyalkylene diethyleneoxide, or a dialkanol amine, such as represented by;

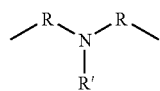

wherein R may be any suitable substituent as defined above and R' may be an alkyl comprising from about 2 to about 25 carbon atoms, for example from about 8 to about 16, or an aryl comprising about 2 to about 25 carbon atoms, for example from about 8 to about 16 such as phenyl, benzyl, methyl, ethyl propyl and the like; and n may be a number of segments of from about 10 to about 1,000, and for example, from about 100 to about 700.

In an embodiment of this disclosure, the unsaturated sulfopolyester amine resin may be represented by;

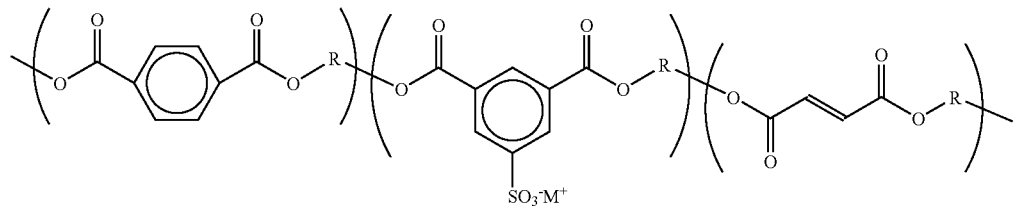

wherein R may be an alkylene comprising from about 2 to about 25 carbon atoms, such as ethylene, propylene, butylene, oxyalkylene diethyleneoxide, or a dialkanol amine, such as represented by;

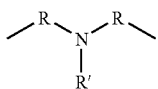

wherein R may be as defined above and R' may be an alkyl or aryl comprising from about 2 to about 25 carbon atoms such as phenyl.

The unsaturated sulfopolyester amine resin may possess a number average molecular weight (Mn) ranging from about 1,500 to about 50,000 grams per mole, and a weight average molecular weight (Mw) ranging from about 6,000 grams per mole to about 150,000 grams per mole as measured by gel permeation chromatography and using polystyrene as standards and a polydispersity of from about 2 to about 12.

The unsaturated sulfopolyester amine resin may be present in the composition in an amount of from about 75 to about 95 weight percent, for example from about 80 to about 90 weight percent, based upon the total weight of the toner composition.

The toner composition may optionally but usually comprise a colorant. The colorant may be selected from the group consisting of dyes and pigments, such as those disclosed in U.S. Pat. Nos. 4,788,123; 4,828,956; 4,894,308; 4,948,686; 4,963,455; and 4,965,158, the disclosures of all of which are hereby incorporated by reference. Non-limiting examples of the pigment include black, cyan, magenta, yellow, green, orange, brown, violet, blue, red, purple, white, and silver. Non-limiting examples of the colorant include carbon black (for example, REGAL 3300®), Flexiverse Pigment BFD1121, nigrosine dye, aniline blue, magnetites and colored magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; phthalocyanines, 2,9-dimethyl-substituted quinacridone and anthraquinone dyes identified in the Color Index as CI 60710, CI Dispersed Red 15, diazo dyes identified in the Color Index as CI26050, CI Solvent Red 19, copper tetra (octadecyl sulfonamide) phthalocyanine, x-copper phthalocyanine pigment listed in the Color Index as CI 74160, CI Pigment Blue, Anthradanthrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, Pigment Yellow 74, B 15:3 cyan pigment dispersion, commercially available from Sun Chemicals, Magenta Red 81:3 pigment dispersion, commercially available from Sun Chemicals, Yellow 180 pigment dispersion, commercially available from Sun Chemicals, cyan components, and the like, as well as mixtures thereof. Other commercial sources of pigments available as aqueous pigment dispersion from either Sun Chemical or Ciba include, but are not limited to, Pigment Yellow 17, Pigment Yellow 14, Pigment Yellow 93, Pigment Yellow 74, Pigment Violet 23, Pigment Violet 1, Pigment Green 7, Pigment Orange 36, Pigment Orange 21, Pigment Orange 16, Pigment Red 185, Pigment Red 122, Pigment Red 81:3, Pigment Blue 15:3, and Pigment Blue 61, and other pigments that enable reproduction of the maximum Pantone color space. Other suitable colorants include, but are not limited to, Cinquasia Magenta (DuPont), Levanyl Black A-SF (Miles, Bayer), Sunsperse Carbon Black LHD 9303, Sunsperse Blue BHD 6000 and Sunsperse Yellow YHD 6001 available from Sun Chemicals; Normandy Magenta RD-2400, Permanent Yellow YE 0305, Permanent Violet VT2645, Argyle Green XP-111-S, Lithol Rubine Toner, Royal Brilliant Red RD-8192, Brilliant Green Toner GR 0991, and Ortho Orange OR 2673, all available from Paul Uhlich; Sudan Orange G, Tolidine Red, and E.D. Toluidine Red, available from Aldrich; Sudan III, Sudan II, and Sudan IV, all available from Matheson, Coleman, Bell; Scarlet for Thermoplast NSD PS PA available from Ugine Kuhlman of Canada; Bon Red C available from Dominion Color Co.; Lumogen Yellow D0790, Suco-Gelb L1250, Suco-Yellow D1355, Paliogen Violet 5100, Paliogen Orange 3040, Paliogen Yellow 152, Neopen Yellow, Paliogen Red 3871 K, Paliogen Red 3340, Paliogen Yellow 1560, Paliogen Violet 5890, Paliogen Blue 6470, Lithol Scarlet 4440, Lithol Fast Scarlet L4300, Lithol Scarlet D3700, Lithol Fast Yellow 0991K, Paliotol Yellow 1840, Heliogen Green L8730, Heliogen Blue L6900, L7202, D6840, D7080, Neopen Blue, Sudan Blue OS, Sudan Orange 220, and Fanal Pink D4830, all available from BASF; Cinquasia Magenta available from DuPont; Novoperm Yellow FG1 available from Hoechst; Hostaperm Pink E, and PV Fast Blue B2G01 all available from American Hoechst; Irgalite Blue BCA, and Oracet Pink RF, all available from Ciba-Geigy. Mixtures of colorants can also be employed.

When present, the optional colorant may be present in the toner composition in any desired or effective amount, such as from about 1% to about 25% by weight of the toner composition, for example from about 2% to about 15%, and as a further example from about 5% to about 12% by weight based upon the total weight of the toner composition. The amount can, however, be outside of these ranges.

The toner composition optionally can also comprise a charge control additive, such as alkyl pyridinium halides, including cetyl pyridinium chloride and others as disclosed in U.S. Pat. No. 4,298,672, the disclosure of which is hereby incorporated by reference, sulfates and bisulfates, including distearyl dimethyl ammonium methyl sulfate as disclosed in U.S. Pat. No. 4,560,635, the disclosure of which is hereby incorporated by reference, and distearyl dimethyl ammonium bisulfate as disclosed in U.S. Pat. Nos. 4,937,157; 4,560,635, and copending application Ser. No. 07/396,497, abandoned, the disclosures of all of which are hereby incorporated by reference, zinc 3,5-di-tert-butyl salicylate compounds, such as Bontron E-84, available from Orient Chemical Company of Japan, or zinc compounds as disclosed in U.S. Pat. No. 4,656,112, the disclosure of which is totally incorporated by reference, aluminum 3,5-di-tert-butyl salicylate compounds' such as Bontron E-88, available from Orient Chemical Company of Japan, or aluminum compounds as disclosed in U.S. Pat. No. 4,845,003, the disclosure of which is hereby incorporated by reference, charge control additives as disclosed in U.S. Pat. Nos. 3,944,493; 4,007,293; 4,079,014; 4,394,430; 4,464,452; 4,480,021; and 4,560,635, the disclosures of all of which are hereby incorporated by reference, and the like, as well as mixtures thereof.

The optional charge control additive may be present in the toner composition in an amount of from about 0.1% to about 10% by weight, for example from about 1% to about 5% by weight with respect to the total weight of the toner composition. The amount can, however, be outside this range.

The toner composition may also optionally comprise an external surface additive, including flow aid additives, which additives may be usually present on the toner surface thereof. Non-limiting examples of the external surface additive include metal oxides like titanium oxide, tin oxide, mixtures thereof, and the like, colloidal silicas, such as AEROSIL®, metal salts and metal salts of fatty acids inclusive of zinc stearate, aluminum oxides, cerium oxides, and mixtures thereof. Several of the aforementioned additives are illustrated in U.S. Pat. Nos. 3,590,000 and 3,800,588, the disclosures of which are totally incorporated herein by reference. Moreover, the external surface additive may be a coated silica of U.S. Pat. Nos. 6,004,714; 6,190,815 and 6,214,507, the disclosures of which are totally incorporated herein by reference. The external surface additive can be added during the aggregation process or blended onto the formed toner particles.

The optional external surface additive may be present in any desired or effective amount, for example, of from about 0.1% to about 5% by weight, as a further example from about 0.1% to about 1% by weight with respect to the total weight of the toner composition. The amount can, however, be outside this range.

The toner composition may also comprise a wax. Non-limiting examples of the wax include polypropylenes and polyethylenes commercially available from Allied Chemical and Petrolite Corporation, wax emulsions available from Michaelman Inc. and the Daniels Products Company, EPOLENE N-15™ commercially available from Eastman Chemical Products, Inc., VISCOL 550P™, a low weight average molecular weight polypropylene available from Sanyo Kasei K. K., and similar materials. The commercially available polyethylenes selected may possess a molecular weight Mw of from about 700 to about 2,500, while the commercially available polypropylenes may possess a molecular weight of from about 4,000 to about 7,000. Examples of functionalized waxes, such as amines, amides, include, for example, AQUA SUPERSLIP 6550™, SUPERSLIP 6530™ available from Micro Powder Inc., fluorinated waxes, for example POLYFLUO 190™, POLYFLUO 200™, POLYFLUO 523XF™, AQUA POLYFLUO 411™, AQUA POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, chlorinated polypropylenes and polyethylenes available from Allied Chemical and Petrolite Corporation and S C Johnson wax.

The disclosed toner composition may be prepared by an emulsion aggregation process. The emulsion aggregation process generally entails (a) preparing a latex emulsion comprising resin particles, (b) combining the latex emulsion with optionally a colorant and optionally an initiator, (c) heating the latex emulsion containing the resin to a temperature below the glass transition temperature of the resin, and (d) after heating the latex emulsion containing the resin to a temperature below the glass transition temperature of the resin, heating the latex emulsion containing the resin to a temperature above the glass transition temperature of the resin. In an embodiment, the emulsion aggregation process entails (a) preparing a dispersion of an optional colorant, (b) admixing the dispersion with a latex emulsion comprising resin particles and an optional flocculating agent, thereby causing flocculation or heterocoagulation of formed particles of colorant and resin to form electrostatically bound aggregates, (c) heating the electrostatically bound aggregates at a temperature below the glass transition temperature ($T_g$) of the resin to form stable aggregates, and (d) heating the stable aggregates at a temperature above the glass transition temperature ($T_g$) of the resin to coalesce the stable aggregates into toner particles.

In another embodiment, the emulsion aggregation process entails (a) preparing a dispersion in a solvent, such as water, the dispersion comprising an optional ionic surfactant, an optional colorant, and an optional charge control agent; (b) shearing the dispersion with a latex emulsion comprising (i) a surfactant which is either (1) counterionic, with a charge polarity of opposite sign to that of the ionic surfactant, or (2) nonioinic, and (ii) at a resin, thereby causing flocculation or heterocoagulation of formed particles of the colorant, resin, and the optional charge control agent to form electrostatically bound aggregates; (c) heating the electrostatically bound aggregates at a temperature below the glass transition temperature of the resin to form stable aggregates (the aggregates have an average particle diameter ranging from about 1 micron to about 25 microns, for example, from about 2 microns to about 10 microns, although the particle size can be outside of this range; the stable aggregates typically have a relatively narrow particle size distribution of GSD=about 1.16 to about GSD=1.25, although the particle size distribution can be outside of this range), and (d) adding an additional amount of the ionic surfactant to the aggregates to stabilize them further, prevent further growth, and prevent loss of desired narrow particle size distribution, and heating the aggregates to a temperature above the resin glass transition temperature to provide coalesced toner particles comprising resin, optional colorant, and optional charge control agent.

Heating can be at a temperature ranging from about 5° C. to about 50° C. above the resin glass transition temperature, although the temperature can be outside this range, to coalesce the electrostatically bound aggregates.

The coalesced particles differ from the uncoalesced aggregates primarily in morphology; the uncoalesced particles have greater surface area, such as having a "grape cluster" shape, whereas the coalesced particles are reduced in surface area, such as having a "potato" shape or even a spherical shape. The particle morphology can be controlled by adjusting conditions during the coalescing process, such as temperature, coalescence time, and the like. Subsequently, the toner particles are washed to remove excess water soluble surfactant or surface absorbed surfactant, and are then dried to produce toner particles.

Another embodiment of the emulsion aggregation process entails using a flocculating or coagulating agent such as poly (aluminum chloride) or poly(aluminum sulfosilicate) instead of a counterionic surfactant of opposite polarity to the at least one ionic surfactant in the latex formation. In this process, the aggregation of submicron latex and colorant and the other optional additives is controlled by the amount of coagulant added, followed by the temperature to which the resultant blend is heated. For example, the closer the temperature is to the Tg of the resin, the bigger the particle size. This process entails (1) preparing a dispersion comprising an ionic surfactant; (2) shearing the dispersion with a latex emulsion comprising (a) a flocculating agent, (b) a nonionic surfactant, and (c) a resin, thereby causing flocculation or heterocoagulation of formed particles of the flocculating agent and the resin to form electrostatically bound aggregates; and (3) heating the electrostatically bound aggregates to form stable aggregates. The aggregates obtained are generally particles in the range of from about 1 to about 25 microns in average particle diameter, and for example, from about 2 to about 10 microns, although the particle size can be outside of these ranges, with relatively narrow particle size distribution.

To the aggregation is added an alkali metal base, such as an aqueous sodium hydroxide solution, to raise the pH of the aggregates from a pH value which is in the range of from about 2.0 to about 3.0 to a pH value in the range of from about 7.0 to about 9.0, and during the coalescence step, the solution can, if desired, be adjusted to a more acidic pH to adjust the particle morphology. The coagulating agent is added in an acidic solution (for example, a 1 molar nitric acid solution) to the mixture of ionic latex and dispersion, and during this addition step the viscosity of the mixture increases. Thereafter, heat and stirring are applied to induce aggregation and formation of micron-sized particles. When the desired particle size is achieved, this size can be frozen by increasing the pH of the mixture, for example from about 7 to about 9, although the pH can be outside of this range. Thereafter the temperature of the mixture can be increased to the desired coalescence temperature, for example from about 80° C. to about 95° C., although the temperature can be outside of this range. Subsequently, the particle morphology can be adjusted by dropping the pH of the mixture, for example, to values of from about 3.5 to about 5.5, although the pH can be outside of this range.

Examples of the ionic surfactant include, but are not limited to, anionic surfactants, such as sodium dodecylsulfate, sodium dodecylbenzene sulfonate, sodium dodecylnaphthalenesulfate, dialkyl benzenealkyl sulfates and sulfonates, abitic acid, NEOGEN R®, and NEOGEN SC® available from Kao, DOWFAX® available from Dow Chemical Co., and the like, as well as mixtures thereof. Anionic surfactants can be employed in any desired or effective amount, such as from about 0.01% to about 10% by weight of monomers used to prepare the copolymer resin, for example from about 0.1% to about 5%, although the amount can be outside of these ranges.

Further examples of the ionic surfactant include, but are not limited to, cationic surfactants, such as dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$ trimethyl ammonium bromide, $C_{15}$ trimethyl ammonium bromide, $C_{17}$ trimethyl ammonium bromide, halide salts of quaternized polyoxyethylalkylamines, dodecylbenzyl triethyl ammonium chloride, MIRAPOL® and ALKAQUAT® (available from Aklaril Chemical Company), SANIZOL® (benzalkonium chloride, available from Kao Chemicals), and the like, as well as mixtures thereof. Cationic surfactants can be employed in any desired or effective amounts, for example, from about 0.1% to about 5% by weight of water, although the amount can be outside of this range. The molar ratio of the cationic surfactant used for flocculation to the anionic surfactant used in latex preparation may be from about 0.5:1 to about 4:1, and for example from about 0.5:1 to about 2:1, although the relative amounts can be outside of these ranges.

Examples of suitable nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol (available from Rhone-Poulenc as IGEPAL CA-210®, IGEPAL CA-520® GEPAL CA-720®, IGEPAL CO-890®, IGEPAL CO-720®, IGEPAL CO-290®, ANTAROX 890®, and ANTAROX 897®), and the like, as well as mixtures thereof. The nonionic surfactant can be present in any desired or effective amount, for example, from about 0.01% to about 10% by weight of monomers used to prepare the copolymer resin, and as a further example, from about 0.1% to about 5%, although the amount can be outside of these ranges.

Emulsion aggregation processes suitable for making the disclosed toner particles are illustrated in a number of patents, the disclosures of which are totally incorporated herein by reference, such as U.S. Pat. Nos. 5,278,020; 5,290,654; 5,308,734; 5,344,738; 5,346,797; 5,348,832; 5,364,729; 5,366,841; 5,370,963; 5,376,172; 5,403,693; 5,418,108; 5,405,728; 5,482,812; 5,496,676; 5,501,935; 5,527,658; 5,585,215; 5,593,807; 5,604,076; 5,622,806; 5,648,193; 5,650,255; 5,650,256; 5,658,704; 5,660,965; 5,723,253; 5,744,520; 5,763,133; 5,766,818; 5,747,215; 5,804,349; 5,827,633; 5,853,944; 5,840,462; 5,863,698; 5,869,215; 5,902,710; 5,910,387; 5,916,725; 5,919,595; 5,922,501; 5,925,488; 5,945,245; 5,977,210; 6,017,671; 6,020,101; 6,045,240; 6,132,924; 6,143,457; and 6,210,853. The components and processes of the patents can be selected for the present disclosure in embodiments thereof.

After an image is formed any suitable conventional electrophotographic development technique can be utilized to deposit the disclosed toner composition on an electrostatic latent image on an imaging member thereby developing the formed image. Well known electrophotographic development techniques include magnetic brush development, cascade development, powder cloud development, electrophoretic development, and the like.

The deposited toner image can be transferred to a receiving member such as paper or transparency material by any suitable technique conventionally used in electrophotography, such as corona transfer, pressure transfer, adhesive transfer, bias roll transfer, and the like. After transfer, the transferred toner image can be fixed to a substrate. The fixing step can also be identical to that conventionally used in electrophotographic imaging. Well known electrographic fusing techniques include heated roll fusing, flash fusing, oven fusing, laminating, adhesive spray fixing, and the like. For example, the toner formed image may be generated by a xerographic or digital imaging process.

The disclosed toner compositions can be applied on a wide array of substrates. For example, the substrate may be paper, cardboard, plastic, foil, metal, and combinations thereof.

Examples

The following examples are illustrative and are non-limiting to the present teachings.

Preparation of Unsaturated Resin A

A one liter Parr Reactor equipped with a mechanical double turbine agitator, a distillation apparatus, and bottom drain valve, was charged with dimethyl terephthalate (263 g), fumaric acid (27.75 g), sodium salt of dimethyl 5-sulfo-isophthalate (38.5 g), 1,2-propanediol (243 g), diethylene glycol (36.3 g), N-phenyl diethanolamine (2.9 g), fascat 4100 (1 g), and hydroquinone (0.2 g). The reactor was heated under a carbon dioxide purge (to inhibit cross-linking) to a temperature of about 140° C., wherein the solids melted. The agitator was turned on to about 100 rpm. The temperature of the reactor was then increased to 165° C. over a 20 minute period, and wherein the methanol/water byproduct started to distill off. The reaction temperature was then slowly increased to 190° C. over a 3 hour period, and the agitator was increased to 200 rpm. The reaction mixture was then increased to 200° C., and the pressure was decreased slowly from atmospheric pressure to about 1 torr over a two hour period, and then maintained at the conditions for an additional 2 hours, followed by pressurizing the reactor to atmospheric pressure with carbon dioxide, and discharged through the bottom drain valve into a cooled metal pan. (The pan was cooled with dry ice in its exterior). The resin was then characterized with a Tg (onset) of 52° C., and softening point of 137° C.

Preparation of Unsaturated Resin B

A one liter Parr Reactor equipped with a mechanical double turbine agitator, a distillation apparatus, and bottom drain valve, was charged with dimethyl terephthalate (263 g), fumaric acid (27.75 g), sodium salt of dimethyl 5-sulfo-isophthalate (41 g), 1,2-propanediol (249 g), diethylene glycol (31.3 g), N-phenyl diethanolamine (2.9 g), fascat 4100 (1 g), and hydroquinone (0.2 g). The reactor was heated under a carbon dioxide purge (to inhibit cross-linking) to a temperature of about 140° C., wherein the solids melted. The agitator was turned on to about 100 rpm. The temperature of the reactor was then increased to 165° C. over a 20 minute period, and wherein the methanol/water byproduct started to distill off. The reaction temperature was then slowly increased to 190° C. over a 3 hour period, and the agitator was increased to 200 rpm. The reaction mixture was then increased to 200° C., and the pressure was decreased slowly from atmospheric pressure to about 1 torr over a two hour period, and then maintained at the conditions for an additional 2 hours, followed by pressurizing the reactor to atmospheric pressure with carbon dioxide, and discharged through the bottom drain valve into a cooled metal pan. (The pan was cooled with dry ice in its exterior). The resin was then characterized with a Tg (onset) of 61° C., and softening point of 155° C.

Preparation of Emulsion Aggregation Toner Composite I

To a 1 liter kettle equipped with a mechanical stirrer, heating mantle, and distillation apparatus was added 1 liter of water and heated to 60° C. A solution of unsaturated resin A (105 g) and thermal initiator VAZO 88 (2 g) dissolved in 1500 g acetone was added dropwise over a 3 hour period. The mixture continued heating for an additional 2 hours, followed by cooling, resulting in an emulsion with a particle size of 54 nm.

A 2 liter glass reactor equipped with overhead stirrer and heating mantle was charged with 956.02 g of the above emulsion (solids content: 10.46%) and 10.49 g cyan Flexiverse pigment BFD1121 (solids content: 48.9%). The mixture was heated to 58° C. with stirring at 200 rpm. 266.67 g zinc acetate (3 wt. % aq. solution) was added dropwise over 5.5 hours. The particle size was monitored with a coulter counter until the volume average particle size was 5.7 μm with a GSD of 1.18, circularity of 0.9. The toner slurry was then cooled to room temperature separated by, sieving (25 microns) filtration, followed by washing and freeze-dried.

Preparation of Emulsion Aggregation Toner Composite II

To a 1 liter kettle equipped with a mechanical stirrer, heating mantle, and distillation apparatus was added 1 liter of water and heated to 60° C. A solution of crystalline resin (30 g) and thermal initiator BPO (5.28 g) dissolved in 300 g acetone was added dropwise over a 1 hour period. The mixture continued heating for an additional 2 hours, followed by cooling, resulting in an emulsion with a particle size of 62.7 nm.

A 2 liter glass reactor equipped with overhead stirrer and heating mantle was charged with 302.34 g of the above emulsion (solids content: 6.96%), 908.97 g emulsion of unsaturated resin A (solids content: 9.26%), 55.48 g wax (solids content: 20.08%) and 28.35 g cyan pigment (solids content: 26.20%). 210.43 g zinc acetate (3 wt. % aq. solution) was added dropwise into the above mixture under homogenization. The mixture was heated to 60° C. with stirring at 600 rpm. over 2 hours. The particle size was monitored with a coulter counter until the volume average particle size was 4.31 μm with a GSD of 1.27. The toner slurry was then cooled to about 23° C. to about 25° C. separated by sieving (25 microns) filtration, followed by washing with water three times, and freeze-dried.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a resin" includes two or more different resins. As used herein, the term "include" and its grammatical variants are intended to be non-limiting, such that recitation of items in a list is not to the exclusion of other like items that can be substituted or added to the listed items.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composition comprising an initiator and an unsaturated sulfopolyester amine resin, wherein the unsaturated sulfopolyester amine resin comprises (i) an amine residue; (ii) an alkali sulfonate residue; and (iii) an unsaturated residue, and wherein the amine residue is selected from the group consisting of secondary functional alkyl amines, tertiary functional alkyl amines, and aromatic functional amines.

2. The composition of claim 1, wherein the initiator is selected from the group consisting of thermal initiators, free radical initiators, and ultra violet initiators.

3. The composition of claim 1, wherein the initiator is selected from the group consisting of azo compounds, peroxides, and pinacols.

4. The composition of claim 3, wherein the azo compounds are selected from the group consisting of 2,2'-azobispropane, 2,2'-dichloro-2,2'-azobispropane, 1,1'-azo(methylethyl)diacetate, 2,2'-azobis(2-amidinopropane)hydrochloride 2,2-azobis(2-amidinopropane) nitrate, 2,2'-azobisisobutane, 2,2'-azobisisobutylamide, 2,2-azobisisobutylonitrile methyl 2,2'-azobis-2-methylpropionate, 2,2'-dichloro-2,2'-azobisbutane, 2,2'-azobis-2-methylbutylonitrile, dimethyl 2,2'-azobisisobutylate, 1,1'-azobis(sodium 1-methylbutylonitrile-3-sulfonate), 2-(4-methylphenylazo)-2-methylmalonodinitrile, 4,4'-azobis-4-cyanovaleric acid, 3,5-dihydroxymethylphenylazo-2-methylmalonodinitrile, 2-(4-bromophenylazo)-2-allylmalononitrile, 2,2'-azobis-2-methylvaleronitrile, dimethyl 4,4-azobis-4-cyanovalarate, 2,2'-azobis-2,4-dimethylvaleronitrile, 1,1'-azobiscyclohexanenitrile, 2,2'-azobis-2-propylbutylonitrile, 1,1'-azobis-1-chlorophenylethane, 1,1'-azobis-1-cyclohexanecarbonitrile, 1,1'-azobis-1-cycloheptanenitrile, 1,1'-azobis-1-phenylethane, 1,1'-azobiscumene, ethyl 4-nitrophenylazobenzylcyanoacetate, phenylazodiphenylmethane, phenylazotriphenylmethane, 4-nitrophenylazotriphenylmethane, 1,1'-azobis-1,2-diphenylethane, poly(bisphenol A-4,4-azobis-4-cyanopentanoate), poly(tetraethyleneglycol-2,2'-azobisisobutylate), azoisobutyronitrile, azodimethylvaleronitrile, diazoaminoazobenzene 2,2'-azodimethylvaleronitrile, 2,2'-azoisobutyronitrile, azobiscyclohexanenitrile, 2-methylbutyronitrile, 2-t-butylazo-2-cyanopropane; 2,2'-azobis(2,4-dimethyl-4-methoxyvaleronitrile), 2,2'-azobis(isobutyronitrile), 2,2'-azobis(2,4-dimethylvaleronitrile), 1,1'-azobis(cyclohexanecarbonitrile), and mixtures thereof.

5. The composition of claim 3, wherein the peroxides are selected from the group consisting of potassium peroxide sulfate, organic hydroperoxides, benzoyl peroxide, lauryl peroxide, 1-1-(t-butylperoxy)-3,3,5-trimethylcyclohexane, n-butyl-4,4-di-(t-butylperoxy)valerate, dicumyl peroxide, dibenzoyl peroxide, di-(n-propyl)peroxydicarbonate, t-butyl benzoate, t-amyl(2-ethylhexyl)monoperoxydicarbonate, 2,2-di-(t-butyl-peroxy)butane, 2,5-dimethyl-2,5-di(t-butylperoxy)-hexane, 1,3-bis(t-butylperoxyisopropyl)benzene, 1,3-bis(cumylperoxyisopropyl)benzene, 2,4-dichlorobenzoyl peroxide, caprylyl peroxide, lauroyl peroxide, t-butyl peroxy-isobutyrate, p-chloro benzoyl peroxide, hydroxyheptyl peroxide, di-t-butyl diperphthalate, 1,1-di(t-butylperoxy)-3,3,5-trimethylcyclohexane, di-t-butyl peroxide, benzoyl peroxides, lauryl peroxide, n-butyl-4,4-di-(t-butylperoxy) valerate, hydrogen peroxide, acetyl peroxide, cumyl peroxide, tert-butyl peroxide, propyonyl peroxide, chlorobenzoyl peroxide, dichlorobenzoyl peroxide, bromomethylbenzoyl peroxide, ammonium persultate, sodium persulfate, potassium persulfate, diisopropyl peroxycarbonate, tetralin hydroperoxide, 1-phenyl-2-methylpropyl-1-hydroperoxide, tert-butyl triphenylperacetate hydroperoxide, tert-butyl performate, tert-butyl peracetate, tert-butyl perbenzoate, tert-butyl phenyl peracetate, tert-butyl methoxyperaceate and tert-butyl N-(3-toluyl)percarbamate,
and mixtures thereof.

6. The composition of claim 3, wherein the initiator is an azo compound.

7. The composition of claim 3, wherein the initiator is a peroxide.

8. The composition of claim 1, wherein the initiator is present in the composition in an amount of from about 1 to about 10 weight percent based upon the total weight of the composition.

9. The composition of claim 1, wherein the amine residue is present in an amount of from about 0.1 to about 10 weight percent based upon the total weight percent of the resin.

10. The composition of claim 1, wherein the alkali sulfonate residue is present in an amount of from about 1.5 to about 5 weight percent based upon the total weight percent of the resin.

11. The composition of claim 1, wherein the unsaturated residue is present in an amount of from about 5 to about 45 weight percent based upon the total weight percent of the resin.

12. The composition of claim 1, wherein the amine residue is a tertiary functional alkyl amine.

13. The composition of claim 12, wherein the tertiary functional alkyl amine is selected from the group consisting of methyldiethanolamine, ethyldiethanolamine, dimethylisopropanolamine, and diisopropylethanolamine.

14. The composition of claim 1, wherein the amine residue is an aromatic functional amine.

15. The composition of claim 14, wherein the aromatic functional amine is selected from the group consisting of N-phenyldiethanolamine, N,N-di(2-hydroxyethyl)-p-toluidine, N,N-di(2-hydroxypropyl)-p-toluidine, 2,6-dimethanol pyridine, 2,4-dihydroxy-5,6-dimethylpyrimidine, 2,4-dihydroxy dihydroxy-6-methylpyrimidine, 4,6-dihydroxypyrimidine, 2,4-dihydroxypyridine, and phenylethylethanolamine.

16. The composition of claim 1, wherein the unsaturated sulfopolyester amine resin is represented by:

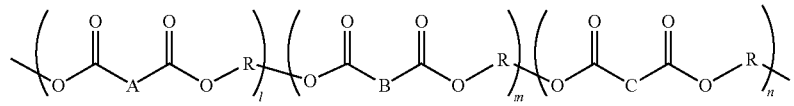

wherein A is an arylene comprising from about 6 to about 36 carbon atoms; I is a number of segments ranging from about 10 to about 1,000; B is an organo alkali sulfonate comprising from about 2 to about 25 carbon atoms; m is a number of segments ranging from about 10 to about 1,000; C is an unsaturated alkene comprising from about 2 to about 25 carbon atoms; R is an alkylene comprising from about 2 to about 25 carbon atoms or a dialkanol amine represented by:

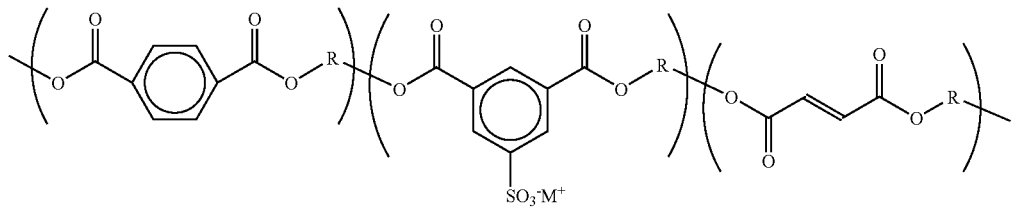

wherein R is as defined above and R' is an alkyl or aryl comprising from about 2 to about 25 carbon atoms; and n is a number of segments ranging from about 10 to about 1,000; with the proviso that at least one R group is a dialkanol amine as defined above.

17. The composition of claim 1, wherein the unsaturated sulfopolyester amine resin is represented by:

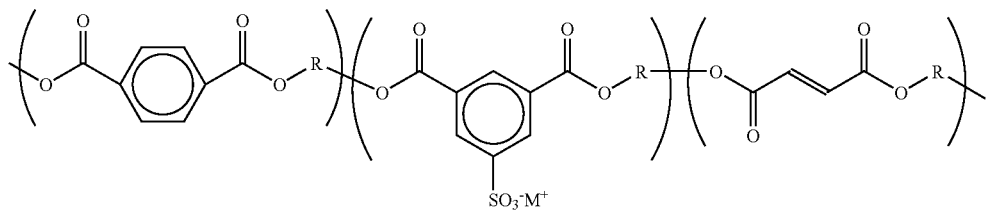

wherein R is an alkylene comprising from about 2 to about 25 carbon atoms or a dialkanol amine, with the proviso that at least one R group is a dialkanol amine represented by:

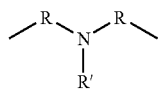

wherein R is as defined above and R' is an alkyl or aryl comprising from about 2 to about 25 carbon atoms.

18. The composition of claim 1, wherein the unsaturated sulfopolyester amine resin is present in the composition in an amount of from about 75 to about 95 weight percent based upon the total weight of the composition.

19. The composition of claim 1, wherein the unsaturated sulfopolyester amine resin is present in the composition in an amount of from about 80 to about 90 weight percent based upon the total weight of the composition.

20. The composition of claim 1, wherein the composition is a toner.

* * * * *

UNITED STATES PATENT AND TRADEMARK OFFICE
CERTIFICATE OF CORRECTION

PATENT NO. : 7,652,128 B2
APPLICATION NO. : 10/981528
DATED : January 26, 2010
INVENTOR(S) : Guerino Sacripante and Ke Zhou It is certified that error appears in the above-identified patent and that said Letters Patent is hereby corrected as shown below:

Col. 17, line 18-45, claim 17, should read

17. The composition of Claim 1, wherein the unsaturated sulfopolyester amine resin is represented by:

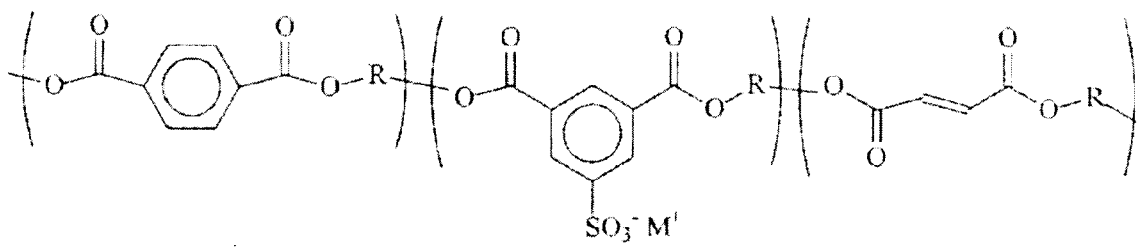

wherein R is an alkylene comprising from about 2 to about 25 carbon atoms or a dialkanol amine, with the proviso that at least one R group is a dialkanol amine represented by:

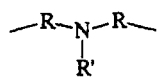

wherein R is as defined above and R' is an alkyl or aryl comprising from about 2 to about 25 carbon atoms.

Signed and Sealed this

Thirteenth Day of April, 2010

David J. Kappos
*Director of the United States Patent and Trademark Office*